United States Patent Office 2,835,130
Patented May 20, 1958

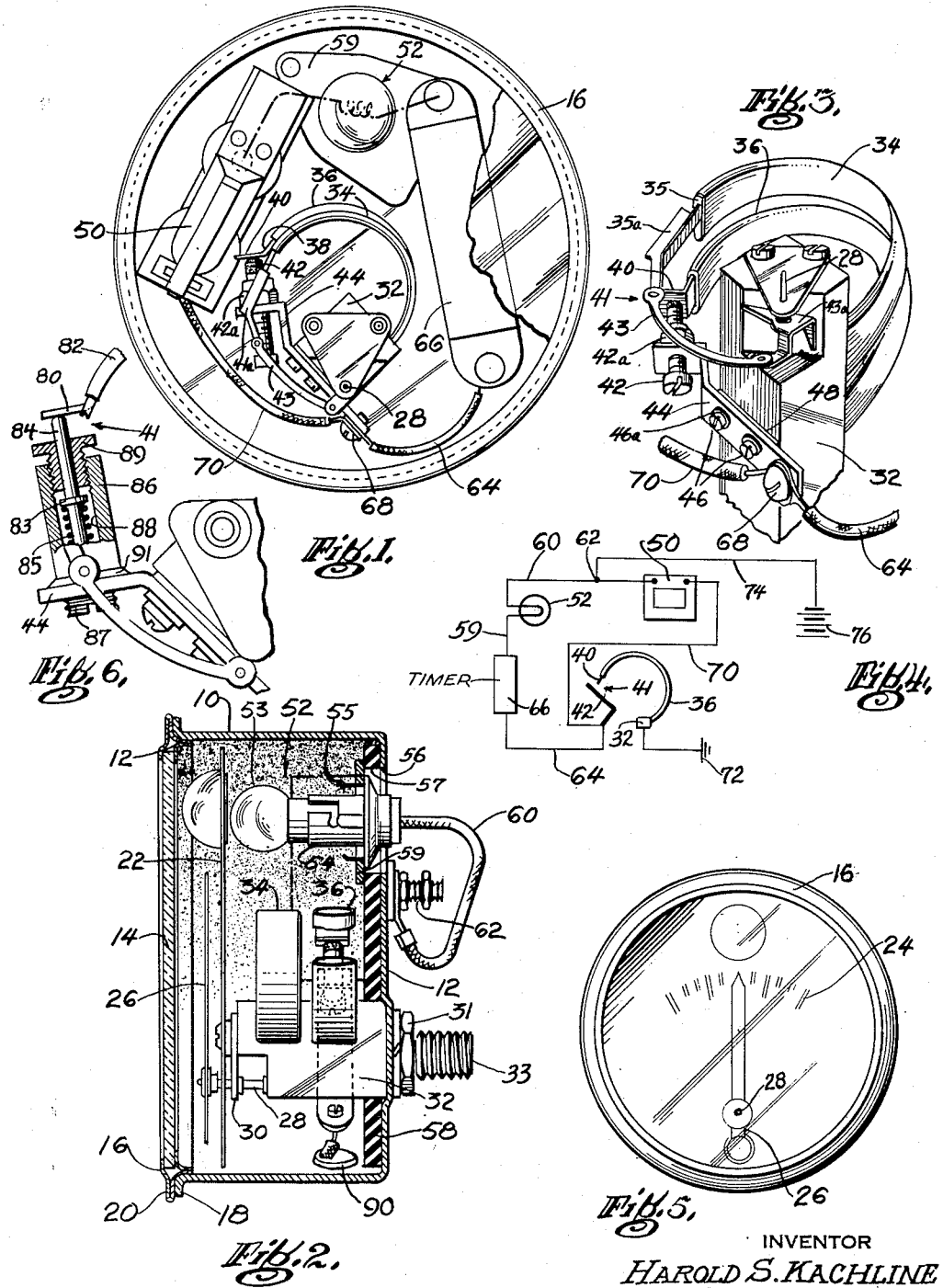

2,835,130

GAUGE AND SIGNAL COMBINATION

Harold S. Kachline, Perkasie, Pa., assignor to American Machine and Metals, Inc., New York, N. Y., a corporation of Delaware Application May 18, 1954, Serial No. 430,670

1 Claim. (Cl. 73—389)

This invention relates to gauges and more particularly to new and improved signaling arrangements for giving warning at a predetermined gauge setting. The gauge is adapted particularly for use with pressure gauges of the type used for indicating air pressure of air brakes and the like.

An object of this invention is to provide an air brake gauge having an improved signaling system that embodies new features of construction and operation which simplify the assembly and installation of the gauge and provide more reliable signaling without impairing the accuracy or limiting the range over which the gauge would otherwise be effective in the absence of the signaling device.

According to one aspect of the invention, a signal operating switch is provided that is actuated when the indicator reaches a predetermined low pressure without affecting the action of the indicator, so that actuation of the signaling means does not impair the accuracy or operation of the indicator in its range beyond such low pressure. In a preferred embodiment of the invention, the gauge includes a double Bourdon tube arrangement which is connected to a single source of pressure, one tube actuating the indicator and the other tube actuating the switch independently of said first tube. In another embodiment of the invention, a yieldable switching device is provided which may be actuated by the Bourdon tube operating the indicator, the switching device yieldably allowing continued free movement of the Bourdon tube in the range below the pressure at which the switch is actuated.

Another feature of the invention resides in the provision of a dual signal device which provides both a visual signal and an audible signal that operate simultaneously yet independently of each other so that in the event one signal fails, the other will continue to give warning at and beyond the predetermined low pressure.

Still another feature of the invention is the provision of a simple control circuit for operating dual signaling means which requires but a single electrical connection to the gauge, the connection being used to introduce power into the gauge.

These and other objects, features and advantages of the invention will become apparent from the following detailed description of the drawings which are merely exemplary.

In the drawings:

Figure 1 is a front elevation of an air brake gauge embodying the present invention with the front transparent cover broken away and the indicator and dial removed to show the operating parts of the gauge;

Figure 2 is a vertical longitudinal section through the gauge shown in Figure 1 with certain parts shown in elevation and other parts broken away in the interest of clarity;

Figure 3 is a perspective of a double Bourdon tube arrangement according to the invention;

Figure 4 is an elementary wiring diagram of the electric circuit controlling the signal device shown in the gauge;

Figure 5 is a front elevation of a gauge; and

Figure 6 is a schematic fragmentary front elevation view, partly in section, of another embodiment of the invention.

Referring now to Figures 1 to 5, inclusive, of the drawings, the air brake gauge includes a cup-shaped metal casing 10 having an opening 12 at its front end which is closed by a transparent cover element 14 that is held in place by an annular frame 16 which fits into opening 12 and frictionally engages the inner periphery of the front margins of the casing. The casing and frame are respectively formed with outwardly extending flanges 18 and 20 which cooperate to limit movement of the frame into the casing. The indicating means of the gauge include a dial 22 which is graduated at 24 and over which a pointer 26 is rotatable to provide pressure readings. The pointer 26 is fixedly mounted on a pointer shaft 28 which extends inwardly through an opening in the dial 22 and is journalled in a plate 30 and a socket 32.

A double Bourdon tube arrangement is mounted on a single socket 32 held in fixed position on the inner side of the back wall of casing 10 by a nut 31 screwed on a threaded connection 33 which extends through an opening in such rear wall. Connection 33 is adapted to be connected with an air pressure supply line. The tubes are identical in construction and will respond to the single source of pressure at the same rates of expansion and contraction. One of the tubes, the pressure indicating tube 34, has its free end connected with pointer shaft 28 through suitable linkage including an arm extension 35a of the tube tip 35, a link 43 and a movement 43a, so as to actuate pointer 26 for continuously indicating the pressure existing in the source being measured.

The other Bourdon tube 36, the switch actuating tube, is provided at its free end with an arm 40 that serves as one of the contacts of a signal energizing switch 41. The tip of an adjustable screw 42 serves as the other contact of switch 41, the screw being threadedly received in a metal bracket 44 which holds the tip in the path of the movement of contact 40. A lock nut 42a holds the screw in any desired position relative to the contact 40 so that the signaling device is readily adjusted through aperture 92 in casing 10 by removing plug 90 to give warning at any desired pressure. The conductor bracket 44 is fixed on the socket 32 but held in spaced relation thereto from the socket by an insulating plate member 48 disposed between the socket and the bracket. The screws 46 securing the bracket to the socket are also held out of contact with the bracket by insulating washers 46a.

The signaling devices comprise a buzzer 50 of any suitable construction and a lamp unit 52. The buzzer 50 is disposed on an insulated plate 58 that lies against the inner side of back wall 12 of casing 10, the buzzer being supported in the casing by a threaded stud 62 which extends through wall 12 and protrudes rearwardly to serve as a terminal for connection with an electric power source. The lamp unit 52 includes a bulb 53 removably held in a socket 54 that is received into the casing through apertures 56 and 57 in the back plate 58 and the back wall 12 of the casing, respectively, the socket being secured in assembled position by spring clips 55 which yieldably engage a metal base plate 59 fixed to insulation plate 58. In the preferred form shown, a timer 66 is disposed on plate 58 and is electrically connected with the lamp for regularly interrupting the circuit through the lamp for blinking the lamp.

The operation of the signal mechanisms are controlled through a signal energizing switch 41 which has contacts 40 and 42 in an electric control circuit diagrammed in Figure 4. The switch is normally held open by the application of pressure to the gauge which expands both the indicating Bourdon tube 34 and the signal operating Bourdon tube 36, the latter holding the contact 40 out of engagement with contact 42. Contact 40 is connected to the casing, which is grounded as indicated at 72, through the metal Bourdon tube 36 and the socket 32. Contact 42 serves as a common connection to switch 41 for lines 64 and 70 leading respectively from one side of the timer 66 and of the buzzer 50. The other side of the timer is connected through plate 59 to one side of the lamp 52. A current supply line 74 is connected at one end with a battery 76 and at its other end with terminal 62 which serves as a common connection for passing current to the other side of the buzzer 50 and of the lamp 52, the buzzer being mounted on the terminal and the lamp being connected thereto by line 60.

The operation of this embodiment will be apparent from the foregoing description but may be summarized as follows:

When the pressure in the air brake operating system falls off, both Bourdon tubes 34 and 36 will contract simultaneously at the same rates. If the pressure falls below a predetermined value, contraction of tube 36 will effect the closing of switch 41 when contact 40 engages contact 42. It will be seen that the contraction of tube 34 is not retarded at the selected warning pressure and continues to accurately indicate the pressure in the source in the range below such selected pressure.

The closing of contacts 40 and 42 energizes the buzzer 50 and the lamp unit 52 causing them to produce audible and visual signals, respectively. The timer 66 acts to continuously interrupt the supply of current to the lamp to effect a blinking signal. It will be seen from the parallel circuit arrangement through the signals that if either signal fails because of a breakdown in the individual signal unit, the other signal will continue to function.

A second embodiment of the signal energizing switch is shown in Figure 6, wherein the switch 41 comprises a contact 80, carried by the pressure indicating Bourdon tube 82, and a yieldable contact 84 mounted in the path of contracting movement of contact 80. The mounting for the yieldable contact 84 comprises a housing 86 supported on bracket 44 and formed with a central bore 88 extending therethrough. The end of the bore adjacent the contact is closed by a threaded plug 89 having a central opening therethrough in which the contact 84 is slidably received. The other end of the housing 86 has a threaded and slotted extension 87 which serves to adjust the position of housing 86, a spring washer 91 maintaining the adjusted position. A spring 85 within the housing yieldably bears against a shoulder 83 on the contact member 84 to hold such contact in position for engagement by the other contact 80. The plug 89 acts as an abutment for a shoulder 83 until pressure drops and contacts 80 and 84 engage. Adjustment of contact 84 is accomplished by rotating plug 89. (This is a factory adjustment.) Field adjustments are made by rotating housing 86 by means of slotted end 87. Spring washer 91 maintains this adjustment.

The other parts of this embodiment and the operation thereof are similar to the embodiment shown in Figures 1 to 5, except that here a single Bourdon tube is used.

When the pressure in the system controlling the air brakes falls off, the tube 82 is contracted, and at a predetermined low pressure, the contacts 80 and 84 will be closed. The force of the spring 85 which opposes contracting movement of the tube is very small and in effect offers no substantial impedance to the movement of the tube after the contacts have been closed, the spring yieldably allowing the contact 84 to be moved freely by the contact 80 in the range below the predetermined low pressure.

It will be understood that the foregoing detailed description and the accompanying drawings are intended to exemplify the invention and that the new parts, improvements and combinations herein disclosed may be embodied in various other forms and arrangements of apparatus without departing from the substance of the disclosure or the intended scope of the appended claim.

What is claimed is:

In a gauge and signal combination, a casing, an indicating arm and a dial on said casing over which the indicating arm is movable, a socket mounted on said casing having a fluid connection with a pressure source to be measured, a pair of Bourdon tubes mounted on said socket and responsive to fluid under pressure from said source, one of said tubes being connected in driving relation to said indicating arm, the other of said tubes having an extension permanently attached to the free end thereof, a bracket mounted on said socket, an adjusting means on said bracket adjacent said extension, aperture means in said casing placed so that said adjusting means can be readily adjusted from the outside of the casing, electrically operated visual and audible signals mounted on said casing, a terminal mounted on said casing and insulated therefrom for connection to one side of a source of electrical energy, said terminal having parallel electrical connections with one side of each of said visual and audible signals respectively, said terminal also providing the means for supporting the audible signal on said casing, and a timer, said bracket having parallel electrical connections with the other side of said audible signal and with one side of the timer, the other side of said timer being connected to the other side of said visual signal so as to provide for an interrupted flow of electrical energy to said visual signal while an uninterrupted flow of electrical energy is provided to the audible signal when the circuit is closed, said extension being adapted to be moved against the bracket upon a predetermined movement of said other Bourdon tube in order to close the circuit for energizing the visual and audible signals.

References Cited in the file of this patent

UNITED STATES PATENTS

| | | |
|---|---|---|
| 409,087 | Williams | Aug. 13, 1889 |
| 716,480 | Rollins | Dec. 23, 1902 |
| 1,285,145 | Harrington et al. | Nov. 19, 1918 |
| 1,607,606 | Clark | Nov. 23, 1926 |
| 1,636,698 | Leonard et al. | July 26, 1927 |
| 1,639,965 | Priest | Aug. 23, 1927 |
| 2,540,444 | Harland | Feb. 6, 1951 |
| 2,709,843 | Hartley | June 7, 1955 |